United States Patent [19]
Ishimoto

[11] Patent Number: 6,126,547
[45] Date of Patent: Oct. 3, 2000

[54] COMPETITIVE VIDEO GAME SYSTEM AND METHOD OF DISPLAYING IMAGES IN COMPETITIVE VIDEO GAME SYSTEM

[75] Inventor: Tomohiro Ishimoto, Tokyo, Japan

[73] Assignee: Konami Co., Ltd., Hyogo-ken, Japan

[21] Appl. No.: 08/926,716

[22] Filed: Sep. 10, 1997

[30] Foreign Application Priority Data

Sep. 20, 1996 [JP] Japan .................................... 8-271771

[51] Int. Cl.[7] ................................................. G09B 19/22
[52] U.S. Cl. ............................................. 463/42; 434/118
[58] Field of Search .............................. 463/3, 4, 30, 31, 463/40–43; 273/317.01–317.06; 434/118

[56] References Cited

U.S. PATENT DOCUMENTS

| | | | |
|---|---|---|---|
| 4,572,509 | 2/1986 | Sitrick | 463/42 |
| 4,672,541 | 6/1987 | Bromley et al. | 364/410 |

*Primary Examiner*—Valencia Martin-Wallace
*Assistant Examiner*—Sheila Clayton
*Attorney, Agent, or Firm*—Jordan and Hamburg LLP

[57] ABSTRACT

A competitive video game system has a plurality of display units and a plurality of manual controllers for a plurality of game players to play a competitive video game such as a soccer game. The game players select respective viewpoints, and image data representative of images to be displayed on the display units is generated on the basis of control signals supplied from the manual controllers and the viewpoints selected by the game players. The generated image data is supplied to the display units to display images based thereon. Each of the game players to select two different viewpoints for a field, such as a soccer field, of the competitive video game. The field comprises an elongate field, and the two different viewpoints comprise a viewpoint for viewing the soccer field in a transverse direction thereof and a viewpoint for viewing the soccer field in a longitudinal direction thereof.

21 Claims, 13 Drawing Sheets

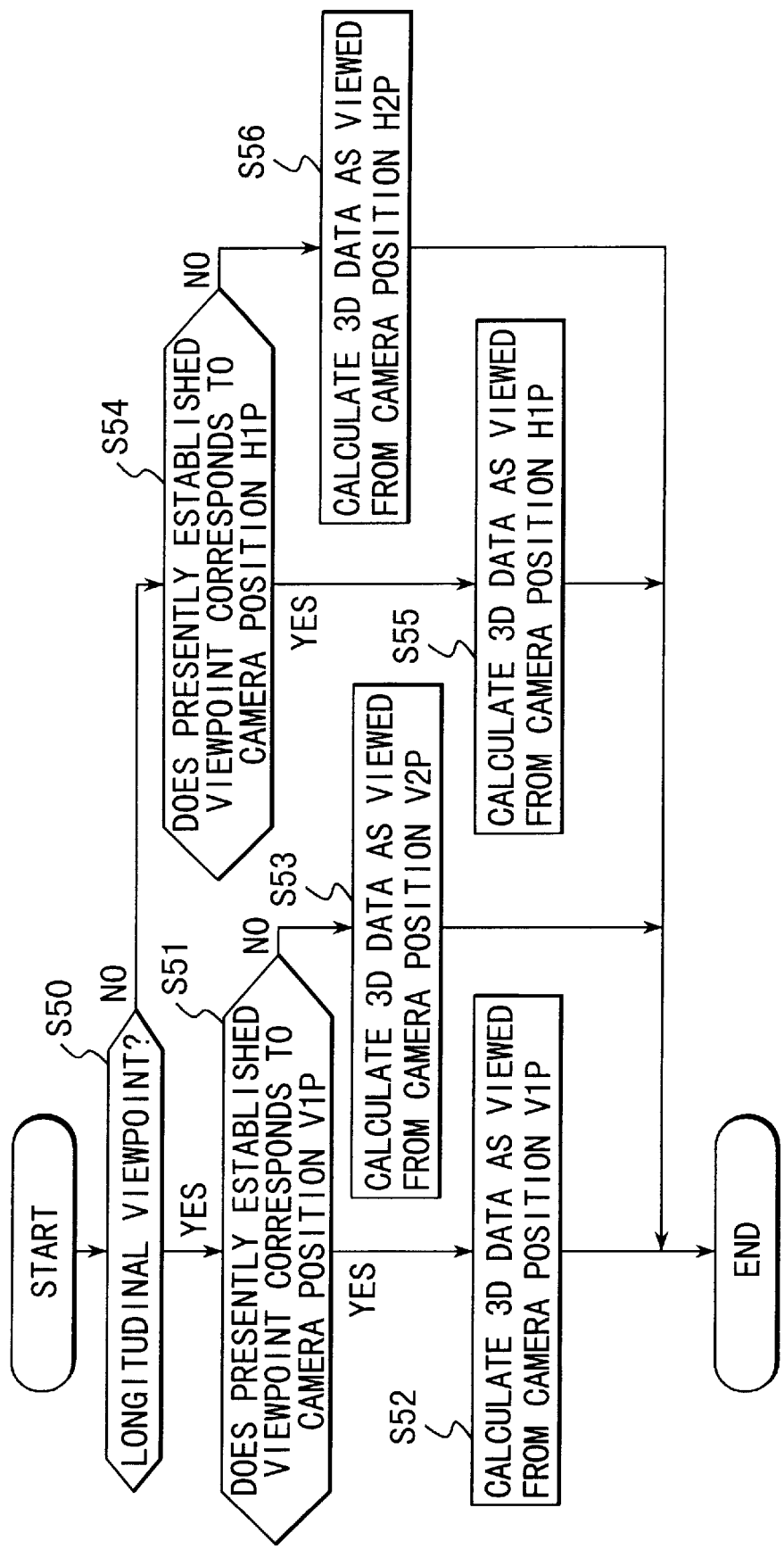

COMPETITIVE VIDEO GAME SYSTEM AND METHOD OF DISPLAYING IMAGES IN COMPETITIVE VIDEO GAME SYSTEM

BACKGROUND OF THE INVENTION

1. Field of the Invention

The present invention relates to a competitive video game system having at least two image display units for allowing at least two game players to play a competitive video game, and a method of displaying images in such a competitive video game system.

2. Description of the Prior Art

Some competitive video game systems have at least two image display units such as CRTs (cathode-ray tubes) for allowing at least two game players to play a competitive video game. Known competitive video games that can be played on such competitive video game systems include sports games such as soccer and basketball games, martial-arts games, racing games, etc.

Two game players play a soccer game on a competitive video game system as follows: After the game players have selected respective soccer teams, the game players operate respective manual controllers to move game characters, i.e., simulated soccer players, of the selected soccer teams to play a soccer game on game images displayed on the display screens of respective CRTs that are assigned to the game players.

Each of the CRTs displays the image of a soccer field as viewed in either a longitudinal direction or a transverse direction thereof. When the image of the soccer field as viewed in the longitudinal direction thereof is displayed, the viewpoint for an attacking team is positioned behind the goal of the offending team, and the viewpoint for a defending team is positioned behind the goal of the defending team (each of these viewpoints will also be referred to as a "longitudinal viewpoint"). When the image of the soccer field as viewed in the transverse direction thereof is displayed, the viewpoint for the attacking team is positioned for the game player to see the attacking team's goal on the left side, and the viewpoint for the defending team is positioned for the game player to see the defending team's goal on the right side (each of these viewpoints will also be referred to as a "transverse viewpoint").

While a competitive video game is being played in game spaces created on the display screens of respective CRTs by two game players, the images of a game field displayed on the respective CRTs are viewed in either a longitudinal direction or a transverse direction thereof. For example, while a soccer game is being played, either the image of the soccer field as viewed in the transverse direction thereof or the image of the soccer field as viewed in the longitudinal direction thereof is displayed on the CRTs from different viewpoints for the respective game players.

Video game systems which display images as viewed only in a transverse direction of the game field (transverse display mode) are not attractive enough to those game players who are not good at video game playing with the images displayed in the transverse display mode. Similarly, video game systems which display images as viewed only in a longitudinal direction of the game field (longitudinal display mode) are not popular among those game players who are not skillful enough to play with the images displayed in the longitudinal display mode. Even video game systems which display images selectively in the longitudinal and transverse display modes should find two game players who are more skilled in the same display mode because the game players have to select one of the longitudinal and transverse display modes in order to play the video game.

SUMMARY OF THE INVENTION

It is therefore an object of the present invention to provide a competitive video game system which is capable of displaying game images in display modes that are suitable for a plurality of game players.

Another object of the present invention is to provide a method of displaying images in such a competitive video game system.

A competitive video game system for playing a competitive video game according to the present invention has a plurality of game machines having respective manual controllers and respective display units. The competitive video game system also has image information generating means for generating image data representative of images to be displayed on the display units, based on control signals supplied from the manual controllers and viewpoints selected by at least one of the game machines, and display control means for supplying the image data generated by the image information generating means to the display units to display images based thereon.

Images are displayed on the display units by allowing the game players to select respective viewpoints, generating image data representative of images to be displayed on the display units, based on control signals supplied from the manual controllers and the viewpoints selected by the game players, and supplying the generated image data to the display units to display images based thereon.

Two or more game players who play a competitive video game on the competitive video game system with the game machines are allowed to freely select viewpoints for displaying images on the respective display units. Therefore, the competitive video game system can provide a comfortable game playing environment for two game players, one not skillful enough at game playing in the longitudinal display mode and one not skillful enough at game playing in the transverse display mode, to play a competitive video game, because each of the game players can select either the longitudinal display mode or the transverse display mode for a preferable viewpoint for displayed images.

Each of the game machines can select two different viewpoints for a field of the competitive video game. The field may comprise an elongate field, the two different viewpoints comprising a viewpoint for viewing the elongate field in a transverse direction thereof and a viewpoint for viewing the elongate field in a longitudinal direction thereof.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 13 is a flowchart of a control sequence of the competitive video game system according to a camera position calculation program as subroutines in the control sequence shown in FIGS. 10 and 11.

DETAILED DESCRIPTION OF THE PREFERRED EMBODIMENT

A preferred embodiment of the present invention will be described below successively in sections under titles that are given below.

Figure 1:
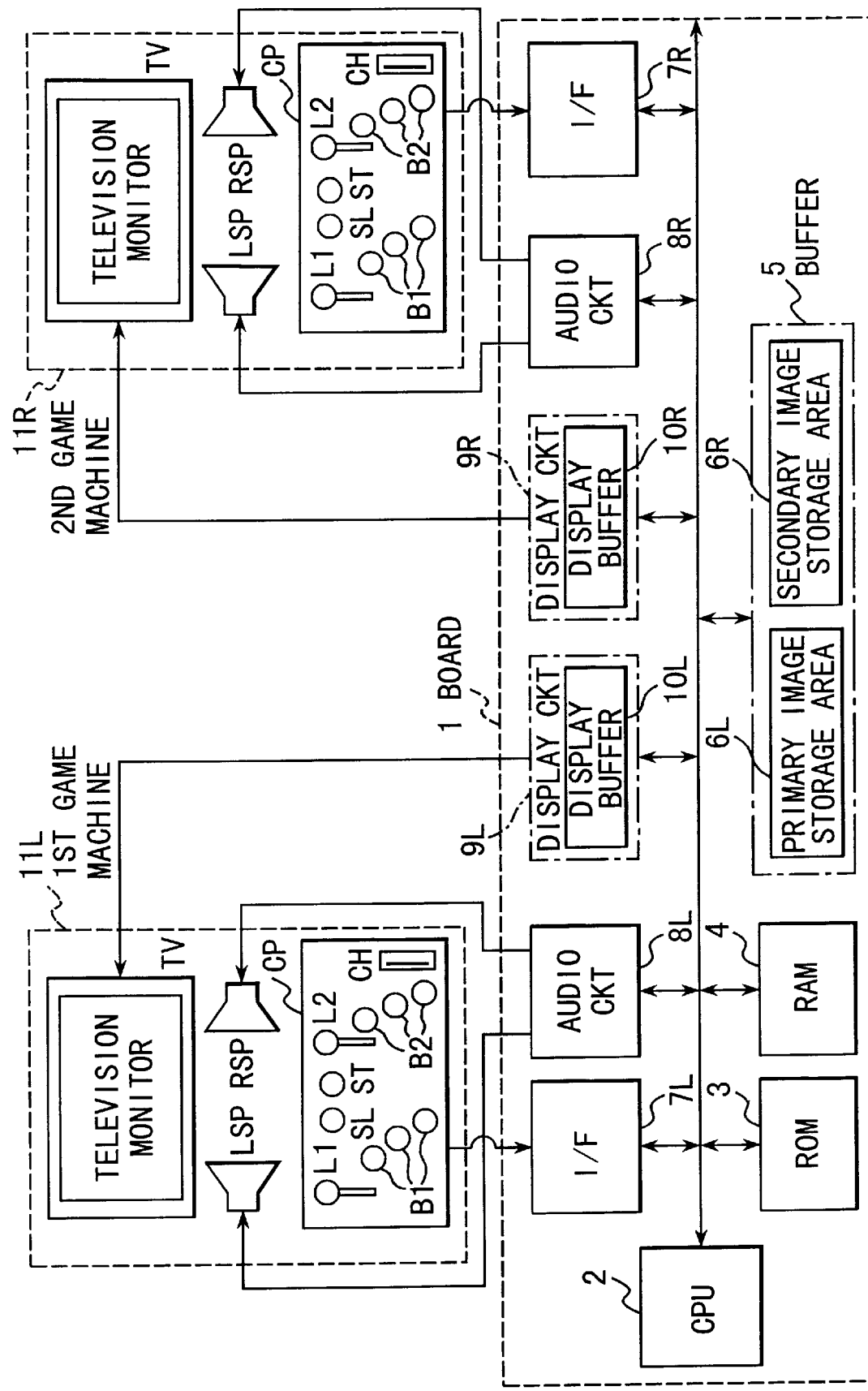
FIG. 1 is a block diagram of a competitive video game system according to the present invention.
Figure 5:
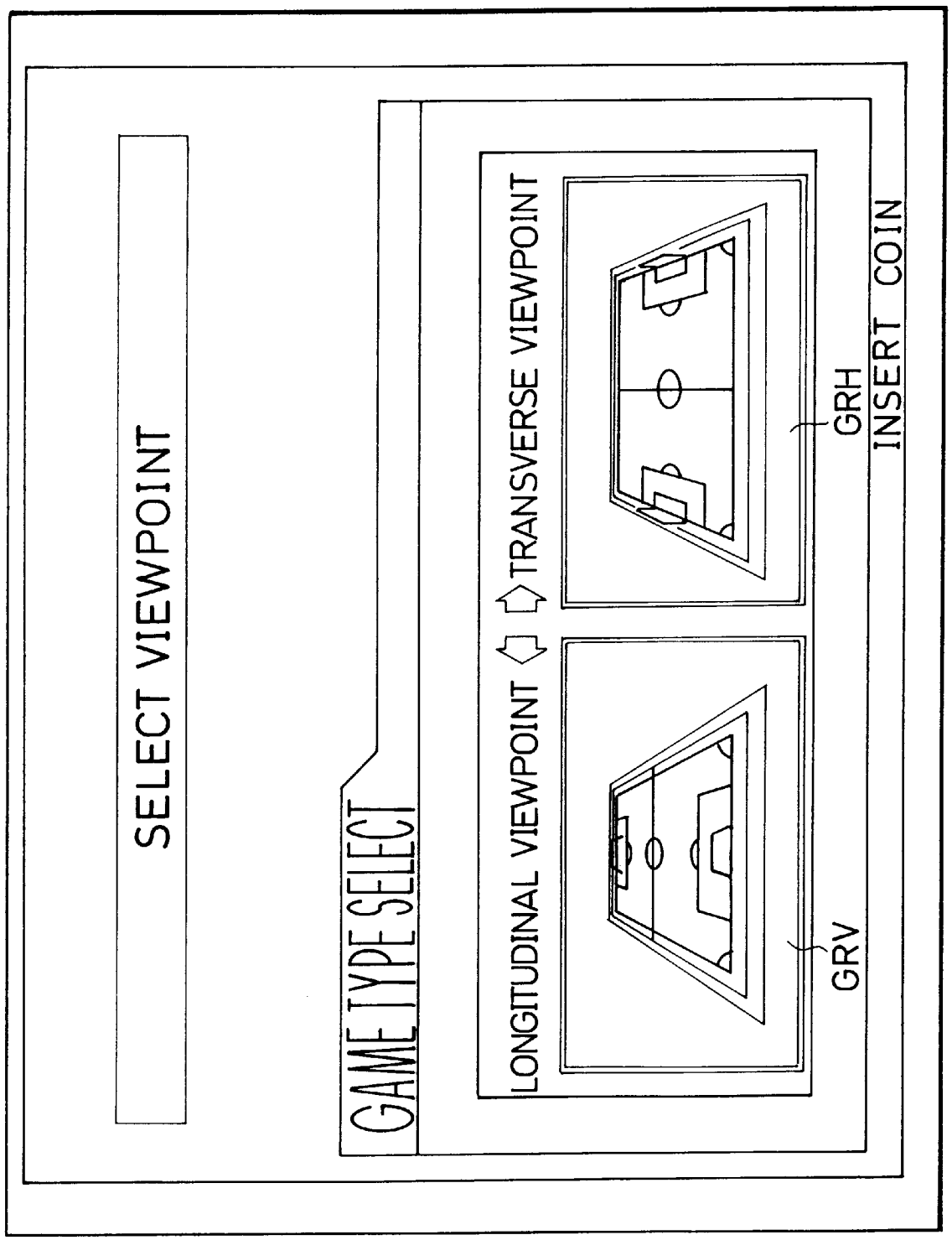
FIG. 5 is a view showing an image for selecting one of longitudinal and transverse viewpoints.
Figure 6:
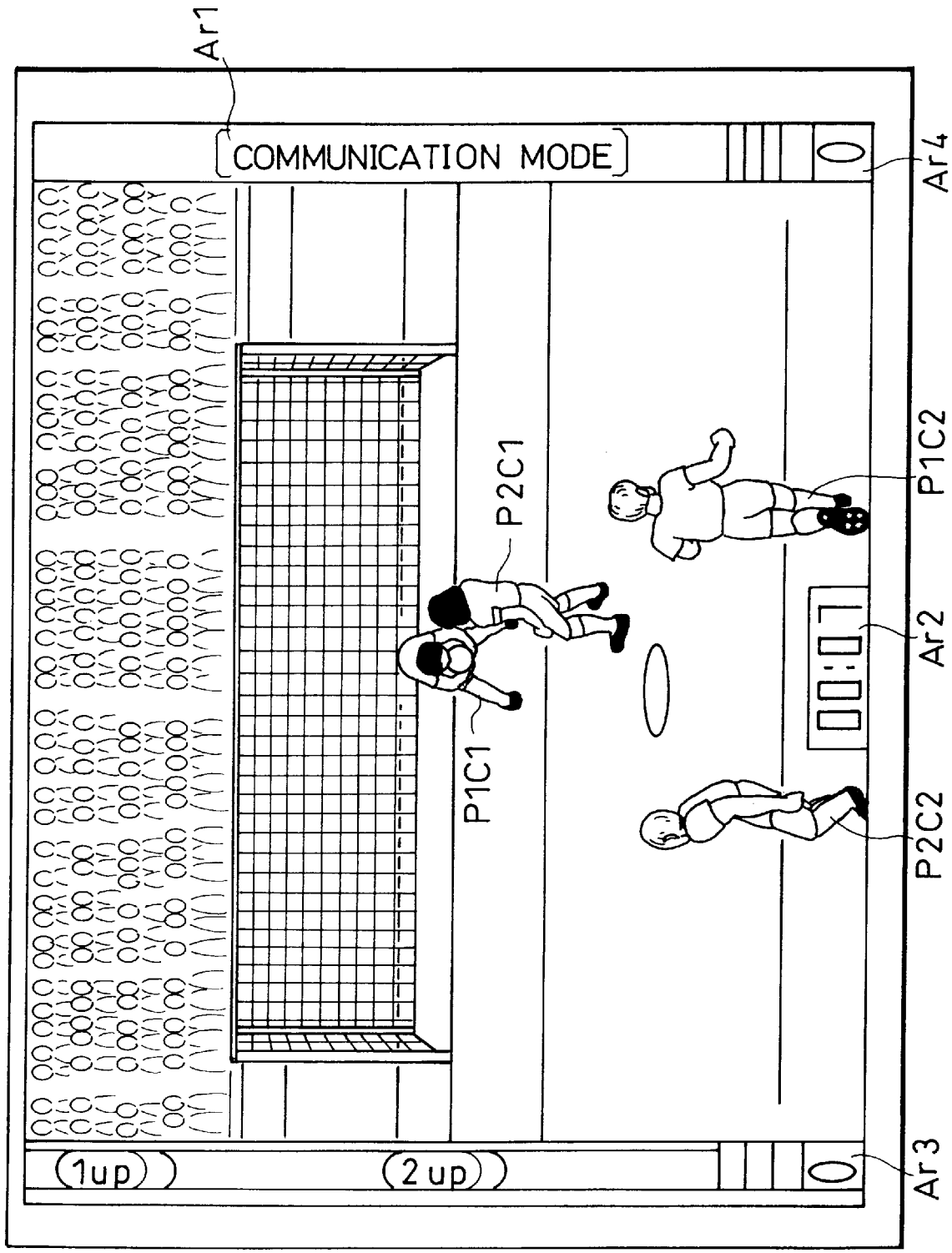
FIG. 6 is a view showing an image that is displayed when the longitudinal viewpoint is selected.
Figure 7:
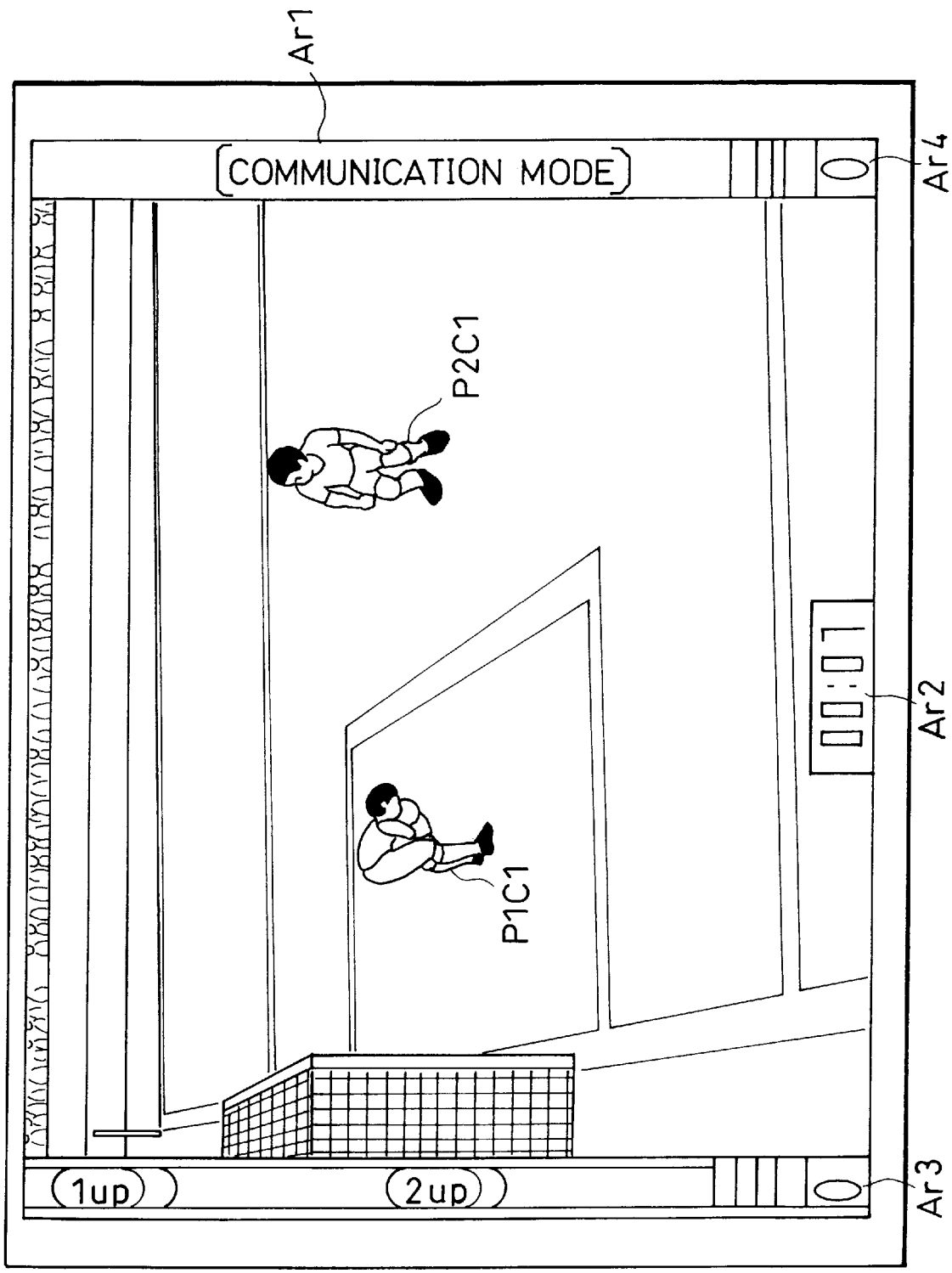
FIG. 7 is a view showing an image that is displayed when the transverse viewpoint is selected.
Figure 8:
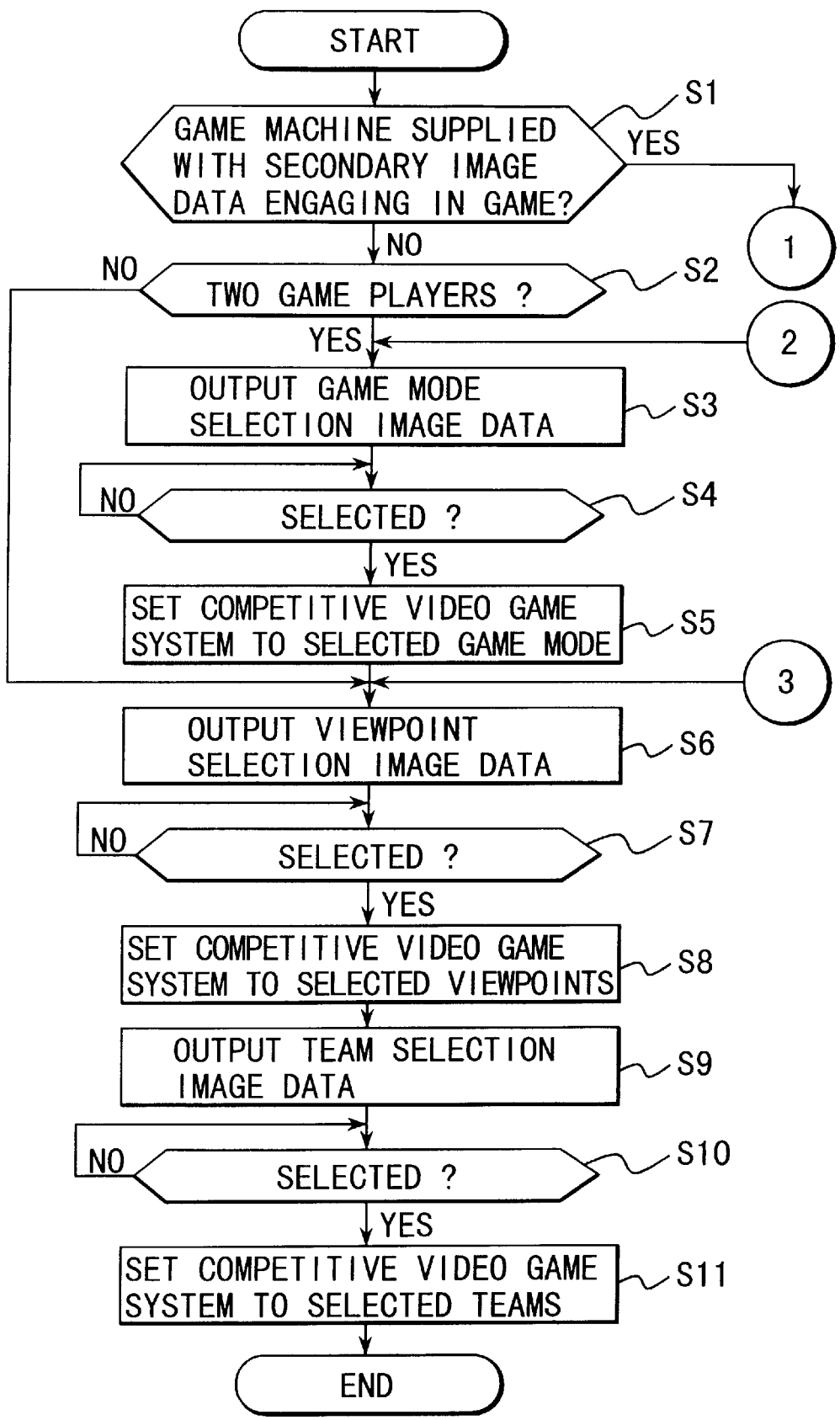
FIGS. 8 and 9 are a flowchart of a control sequence of the competitive video game system according to a selection program.
Figure 9:
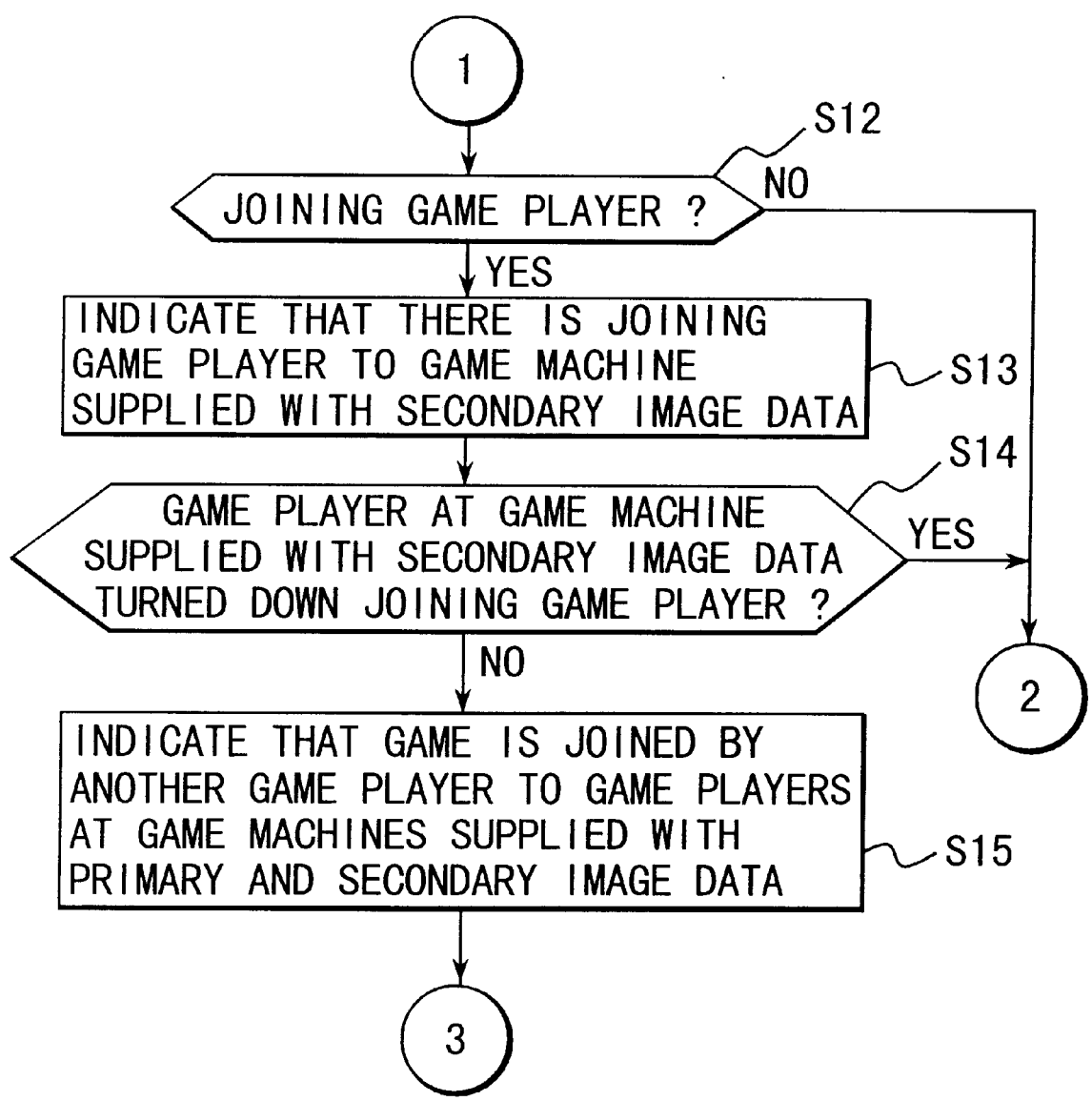
Figure 10:
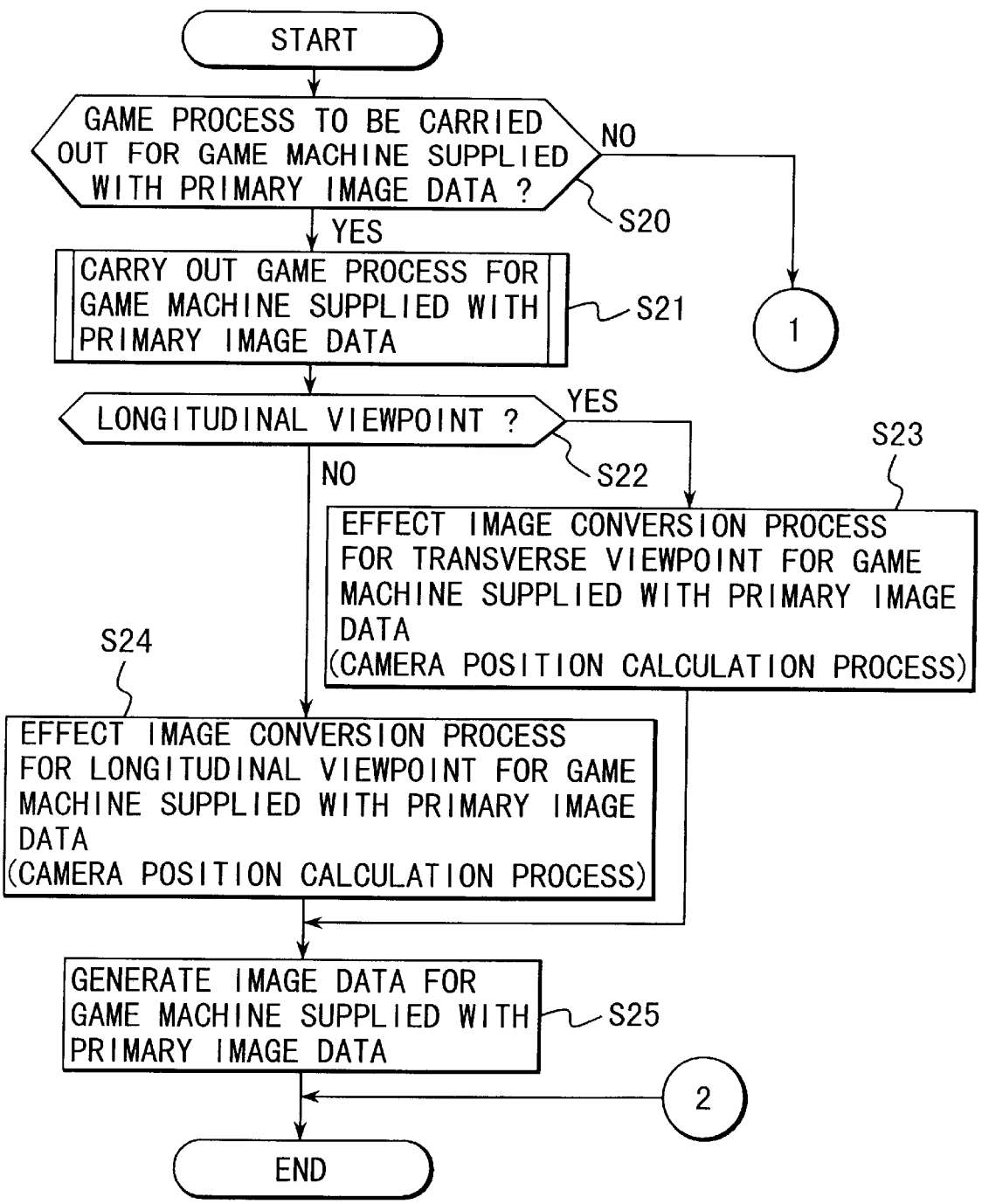
FIGS. 10 and 11 are a flowchart of a control sequence of the competitive video game system according to a game program.
Figure 11:
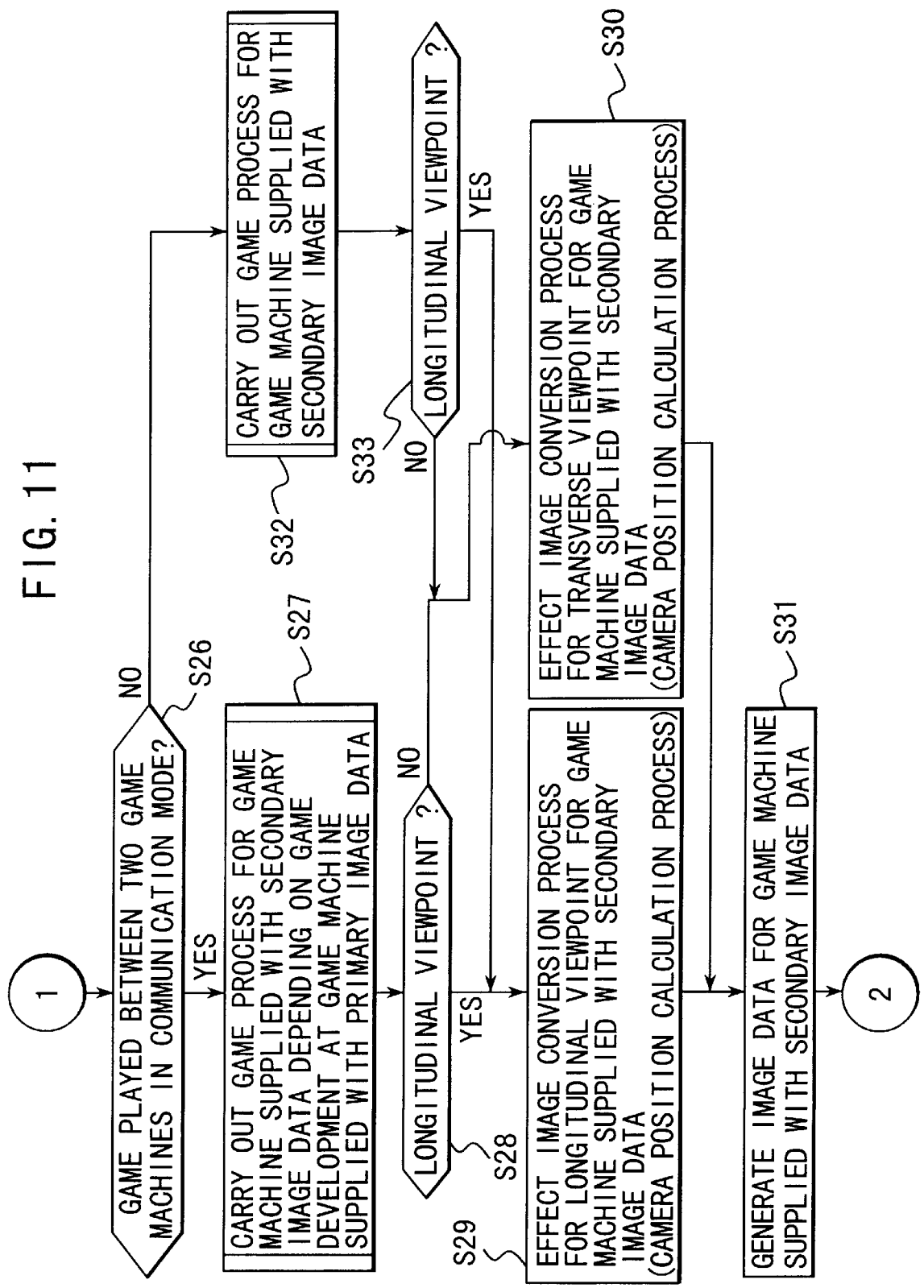

A. Structure of competitive video game system (FIG. 1);
B. Viewpoints (FIGS. 2, 3A~3C, 4A~4C);
C. Displayed images (FIGS. 5~7);
D. Control sequence according to selection program (FIGS. 8 and 9);
E. Control sequence according to game program (FIGS. 10 and 11);
F. Control sequence according to display program (FIG. 12); and
G. Control sequence according to camera position calculation program (FIG. 13).

A. Structure of Competitive Video Game System (FIG. 1):

FIG. 1 shows in block form a competitive video game system according to the present invention. Among various competitive video games that can be played on the competitive video game system are baseball, basketball, volleyball, tennis, soccer, martial-arts, and racing games. For illustrative purpose, a soccer game will be described as a competitive video game that is played on the competitive video game system.

[Connections and Structural Details]

The competitive video game system shown in FIG. 1 generally comprises a first game machine 11L, a second game machine 11R, and a control board 1 that is accommodated in either the first game machine 11L or the second game machine 11R. Each of the first game machine 11L and the second game machine 11R has a television monitor TV, a pair of loudspeakers LSP, RSP, and a control panel CP. Each of the control panels CP has two identical control sections such that a maximum of four game players can play a competitive video game at the same time. Specifically, each of the control panels CP has two control levers L1, L2, two sets of control buttons B1, B2, a joining button SL, a decision button ST, and a coin insertion slot CH.

Competitive video games can be played on the competitive video game system in one of the following game modes 1~5:

[When One of the First and Second Game Machines 11L, 11R is Used]

1. A competitive video soccer game is played between a soccer team controlled by a game player and a soccer team controlled by a CPU (Central Processing unit) of the competitive video game system.

2. A competitive video soccer game is played between a soccer team controlled by a game player and a soccer team controlled by another game player.

[When Both of the First and Second Game Machines 11L, 11R are Used]

3. Competitive video soccer games are played respectively on the first and second game machines 11L, 11R in the mode 1.

4. Competitive video soccer games are played respectively on the first and second game machines 11L, 11R in the mode 2.

5. A competitive video soccer game is played between a soccer team controlled by one or two game players and another soccer team controlled by another one or two game players.

The competitive video soccer game played in the mode 5 may be a competitive video soccer game played by a joining game player. Specifically, while a competitive video soccer game is being played between a game player and the CPU or between a game player and another game player on the first game machine 11L or the second game machine 11R, a new game player may insert a coin into the coin insertion slot CH of the second game machine 11R or the first game machine 11L to make a proposal to the first game player to join the competitive video soccer game. The first game player may either turn down the proposal or accept the proposal in which case a competitive video soccer game is initiated in the mode 5.

The board 1 supports thereon a single control system for controlling the first game machine 11L and the second game machine 11R, and two video systems and two audio systems. Specifically, the board 1 supports a CPU 2 to which a bus 12 including an address bus, a data bus, and a control bus is connected. To the bus assembly, there are connected a ROM (Read-Only Memory) 3 that stores program data (described later on), a working RAM (Random-Access Memory) 4, a buffer 5 having a primary image storage area 6L for storing primary image data (described later on) and a secondary image storage area 6R for storing secondary image data (described later on), interface circuits 7L, 7R for reading control data from the control panels CP of the first and second game machines 11L, 11R, display circuits 9L, 9R having respective display buffers 10L, 10R for supplying video signals to the television monitors TV of the first and second game machines 11L, 11R, and audio circuits 8L, 8R for supplying audio signals to the loudspeakers LSP, RSP of the first and second game machines 11L, 11R, all mounted on the board 1.

Unless otherwise specified, the primary image data is defined as image data to be supplied to the first game machine 11L or the second game machine 11R for a game player entity 1P which may be a single game player or two game players who have selected a soccer team, and the secondary image data is defined as image data to be supplied to the second game machine 11R or the first game machine 11L for a game player entity 2P which may be a single game player or two game players who have selected an opponent soccer team.

The primary and secondary image storage areas 6L, 6R store the primary image data and the secondary image data, respectively. The primary image data represents images to be displayed on the television monitor TV of the first game machine 11L or the second game machine 11R that is initially operated, and the secondary image data represents images to be displayed on the television monitor TV of the second game machine 11R or the first game machine 11L that is subsequently operated. Either the first game machine 11L or the second game machine 11R can be operated initially when it is triggered by a coin that is inserted through the coin insertion slot CH earlier than the other.

Primary image data stored in the primary image storage area 6L is transferred to the display buffer 10L or 10R of the display circuit 9L or 9R for the first or second game machine 11L or 11R which has been operated initially. Secondary image data stored in the secondary image storage area 6R is transferred to the display buffer 10R or 10L of the display circuit 9R or 9L for the second or first game machine 11R or 11L which has been operated subsequently.

Figure 2:
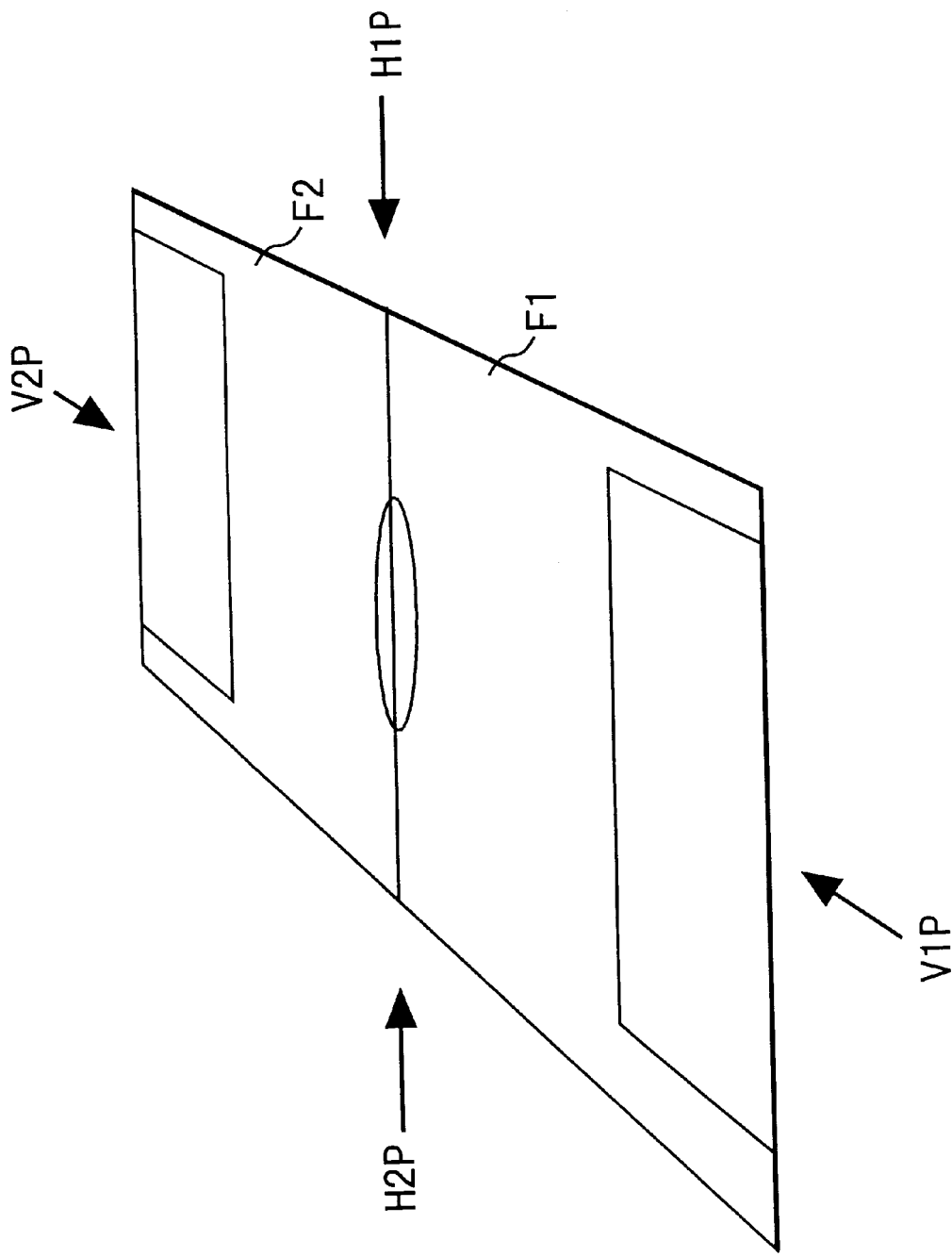
FIG. 2 is a view illustrative of viewpoints with respect to a soccer field that is hypothetically established in a three-dimensional space.
Figure 3A:
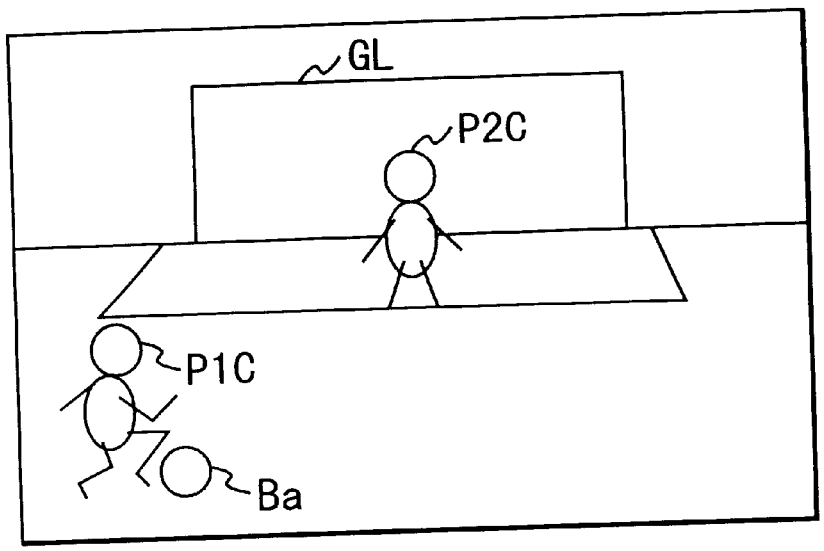
FIG. 3A is a view showing an image of the soccer field as viewed from a viewpoint in a longitudinal direction thereof, i.e., displayed in a longitudinal display mode.
Figure 3B:
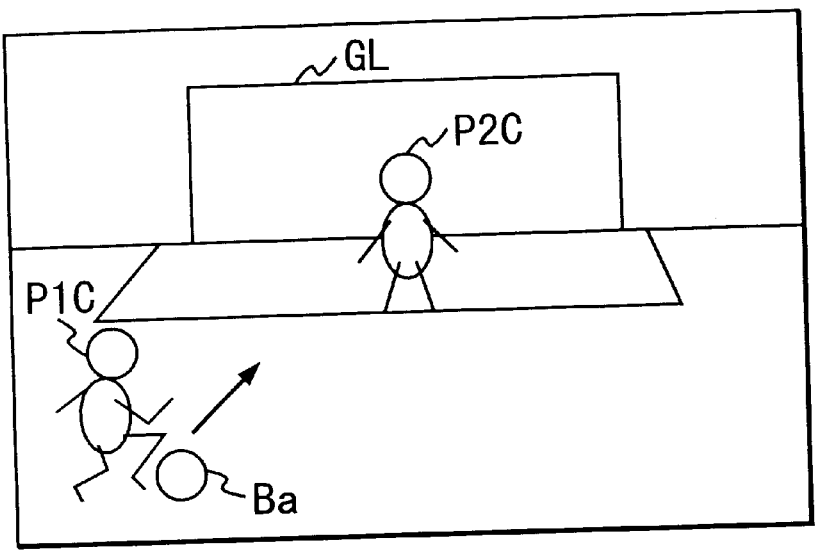
FIG. 3B is a view showing an image of the soccer field displayed in the longitudinal display mode, as viewed from a game player entity 1P.
Figure 3C:
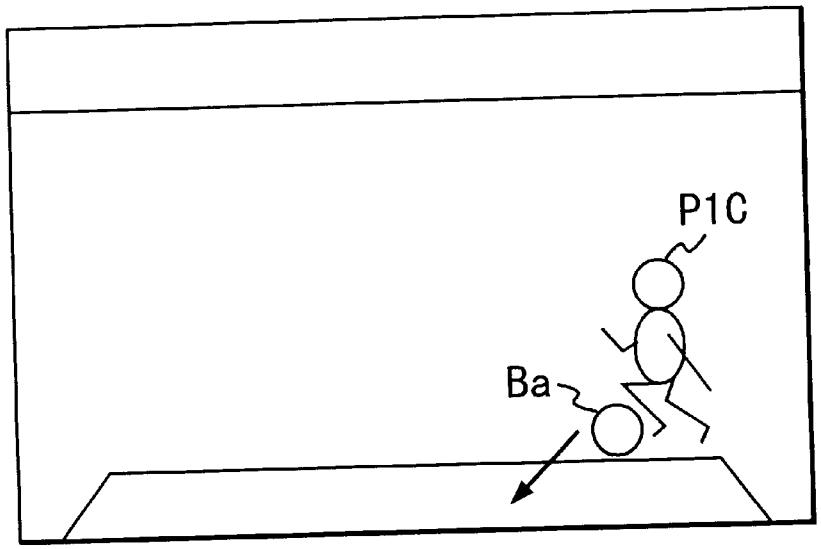
FIG. 3C is a view showing an image of the soccer field displayed in the longitudinal display mode, as viewed from a game player entity 2P.
Figure 4A:
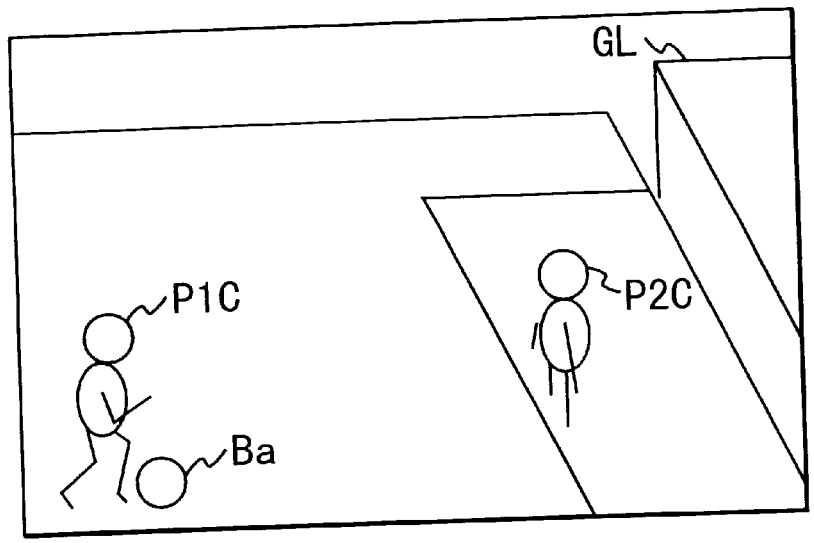
FIG. 4A is a view showing an image of the soccer field as viewed from a viewpoint in a transverse direction thereof, i.e., displayed in a transverse display mode.
Figure 4B:
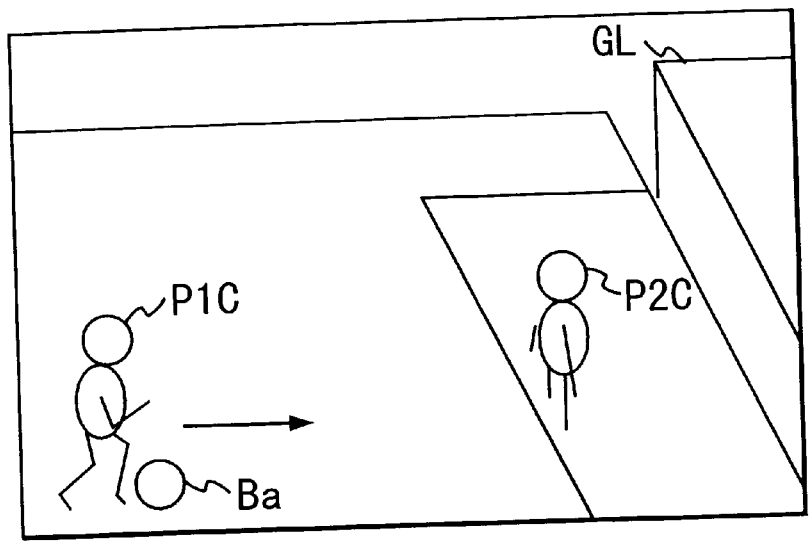
FIG. 4B is a view showing an image of the soccer field displayed in the transverse display mode, as viewed from the game player entity 1P.
Figure 4C:
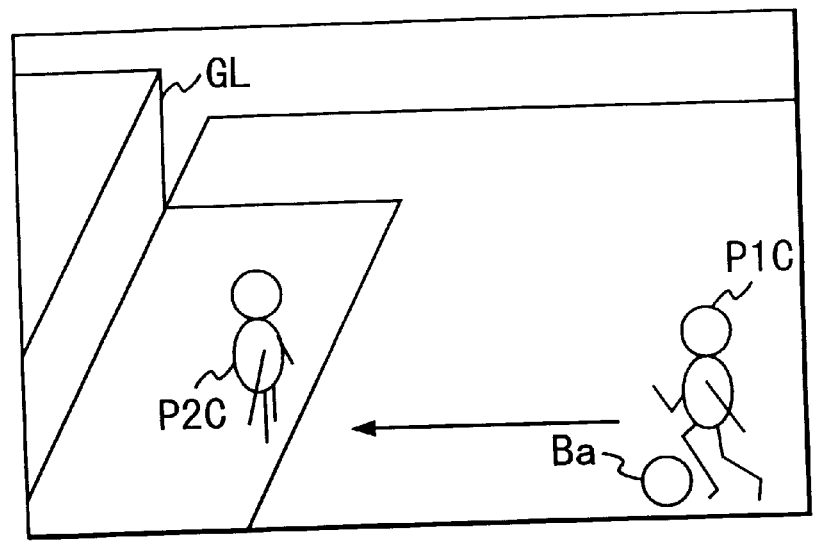
FIG. 4C is a view showing an image of the soccer field displayed in the transverse display mode, as viewed from the game player entity 2P.

B. Viewpoints (FIGS. 2, 3A~3C, 4A~4C):

FIGS. 2, 3A~3C, 4A~4C show displayed images illustrative of viewpoints in a video soccer game. FIG. 2 is illustrative of viewpoints with respect to a soccer field. FIGS. 3A through 3C show images of the soccer field displayed on the television monitors TV as viewed from viewpoints (longitudinal viewpoints) in a longitudinal direction of the soccer field. FIGS. 4A through 4C show images of the soccer field displayed on the television monitors TV as viewed from viewpoints (transverse viewpoints) in a transverse direction of the soccer field.

As shown in FIG. 2, four viewpoints can be established with respect to a soccer field in a game space. For playing a video soccer game on the competitive video game system, two game players may be involved, each assigned a soccer team, or two pairs of game players, each pair assigned a soccer team, may be involved. In either case, one game player entity is referred to as 1P and the other game player entity as 2P. In the game space, a video soccer game is played by two soccer teams that are handled by the respective game player entities 1P, 2P, and a field belonging to one of the soccer teams is referred to as a 1P field F1, and a field belonging to the other the soccer team is referred to as a 2P field F2. An image displayed on the television monitor TV assigned to the game player entity 1P is either an image generated from a camera position V1P at a longitudinal viewpoint for the game player entity 1P or an image generated from a camera position H1P at a transverse viewpoint for the game player entity 1P. Similarly, an image displayed on the television monitor TV assigned to the game player entity 2P is either an image generated from a camera position V2P at a longitudinal viewpoint for the game player entity 2P or an image generated from a camera position H2P at a transverse viewpoint for the game player entity 2P.

FIG. 3A shows an image of the soccer field as viewed in a longitudinal direction thereof, i.e., displayed in a longitudinal display mode. In the longitudinal display mode, the television monitor TV assigned to the attacking game player displays an image shown in FIG. 3B. The image shown in FIG. 3B is displayed when the viewpoint is established at the camera position V1P in FIG. 2. In FIG. 3B, the image indicates that a game character or soccer player P1C controlled by the attacking game player is trying to shoot a ball Ba into a goal GL that is protected by a game character or soccer player P2C controlled by the defending game player.

At this time, an image shown in FIG. 3C is displayed on the television monitor TV assigned to the defending game player. The image shown in FIG. 3C is displayed when the viewpoint is established at the camera position V2P in FIG. 2. In FIG. 3C, the image indicates that the game character or soccer player P1C, controlled by the attacking game player is trying to shoot the ball Ba into the goal of the defending game player.

FIG. 4A shows an image of the soccer field as viewed in a transverse direction thereof, i.e., displayed in a transverse display mode. In the transverse display mode, the television monitor TV assigned to the attacking game player displays an image shown in FIG. 4B. The image shown in FIG. 4B is displayed when the viewpoint is established at the camera position H1P in FIG. 2. In FIG. 4B, the image indicates that a game character, or soccer player P1C, controlled by the attacking game player is trying to shoot a ball Ba into a goal GL that is protected by a game character, or soccer player P2C, controlled by the defending game player.

At this time, an image shown in FIG. 4C is displayed on the television monitor TV assigned to the defending game player. The image shown in FIG. 4C is displayed when the viewpoint is established at the camera position H2P in FIG. 2. In FIG. 4C, the image indicates that the game character, or soccer player P1C, controlled by the attacking game player is trying to shoot the ball Ba into the goal of the defending game player.

The two television monitors TV of the first and second game machines 11L, 11R can display images from respective viewpoints which may be selected in the following combinations:

1. Camera positions H1P, H2P;
2. Camera positions V1P, V2P;
3. Camera positions H1P, V2P; and
4. Camera positions V1P, H2P.

Therefore, the two television monitors TV can display images in a total of four combinations. In two of the four combinations, images are displayed simultaneously in different display modes, i.e., from different viewpoints, e.g., images are displayed from the camera positions H1P, V2P and from the camera positions V1P, H2P. Since each of the two game players can select either the longitudinal or transverse display mode independently, the competitive video game system allows various game players to play the soccer game even if both the game players are not good enough to play the soccer game with images displayed in the longitudinal or transverse display mode or one of the game players is not skillful enough to play the soccer game with images displayed in the longitudinal display mode whereas the other game player is not skillful enough to play the soccer game with images displayed in the transverse display mode.

C. Displayed Images (FIGS. 5~7):

FIG. 5 shows an image displayed on each of the television monitors TV for selecting one of the longitudinal and transverse viewpoints when a soccer game is started.

When a soccer game is started on the competitive video game system, each of the television monitors TV of the first and second game machines 11L, 11R displays the selection image shown in FIG. 5. Using the displayed selection image, each of the game players can select either the longitudinal viewpoint or the transverse viewpoint for images to be displayed on the display screen of its own television monitor TV. As shown in FIG. 5, the displayed selection image includes a longitudinal viewpoint selection image GRV and a transverse viewpoint selection image GRH. Each of the game players can select either the longitudinal viewpoint or the transverse viewpoint by moving the control lever L1 or L2 on the control panel CP to the left or right. When the longitudinal viewpoint is selected, the frame of the longitudinal viewpoint selection image GRV is highlighted, and when the transverse viewpoint is selected, the frame of the transverse viewpoint selection image GRH is highlighted. Each of the game players can determine the selected viewpoint by pressing the decision button ST on the control panel CP.

FIG. 6 shows an image that is displayed in the soccer game when the longitudinal viewpoint is selected, and FIG. 7 shows an image that is displayed in the soccer game when the transverse viewpoint is selected. As shown in FIGS. 6 and 7, each of the displayed images includes a display area Ar1 for indicating that the soccer game is being played in a communication mode in which the first and second game machines 11L, 11R communicate with each other, a display area Ar2 for displaying time, a display area Ar3 for displaying the score of the game player entity 1P, a display area Ar4 for displaying the score of the game player entity 2P, and a field display area for displaying a soccer field including game characters or simulated soccer players.

In FIG. 6, the field display area displays game characters or soccer players P1C1, P1C2 of the attacking game player entity 1P and game characters or soccer players P2C1, P2C2 of the defending game player entity 2P, from a viewpoint of the defending game player entity 2P, which is the longitudinal viewpoint in FIG. 6. The same field display area as viewed from the transverse viewpoint is displayed in FIG. 7. In FIG. 7, the field display area displays the game character or soccer player P1C1 of the attacking game player entity 1P and the game character or soccer player P2C1 of the defending game player entity 2P, from the transverse viewpoint. In the longitudinal viewpoint established, the defending team is seen on the right side and the attacking team is seen on the left side.

Control sequences according to various programs will be described in sections D~G below. One cycle of control sequences is completed when the programs in the sections D~F are executed once. Cycles are alternately assigned to the first game machine 11L and the second game machine 11R based on a vertical synchronizing signal. Cycles of the first game machine 11L and the second game machine 11R are not assigned to odd- and even-numbered fields, but immediately after one cycle of the first game machine 11L or the second game machine 11R is finished, a next cycle of the second game machine 11R or the first game machine 11L is initiated from the field right after the preceding cycle. The program in the section G represents subroutines in the program in the section E. For illustrative purposes, a soccer game played by two game players who control the first and second game machines 11L, 11R, respectively, will be described below.

D. Control Sequence According to Selection Program (FIGS. 8 and 9):

In a step S1 (see FIG. 8), the CPU 2 determines whether the first game machine 11L or the second game machine 11R which is supplied with secondary image data is already engaging in a soccer game or not. If it is already engaging in a soccer game (YES), then control goes to a step S12 (FIG. 9). If not (NO), then control goes to a step S2. The CPU 2 makes the decision in the step S1 by reading a flag stored in a communication area in the RAM 4 shown in FIG. 1. As described above, the secondary image data represents image data is supplied to the first game machine 11L or the second game machine 11R for being displayed on the television monitor TV thereof.

In the step S2, the CPU 2 determines whether there are two game players or not. If there are two game players (YES), then control goes to a step S3. If not (NO), then control jumps to a step S6. The CPU 2 makes the decision in the step S3 by detecting the number of coins inserted through the coin insertion slot CH or a two-player mode indicated by a button on the control panel CP.

In the step S3, the CPU 2 outputs game mode selection image data through the buffer 5 and the display circuits 9L, 9R to the television monitors TV of the first and second game machines 11L, 11R for displaying a game mode selection image thereon. The game mode selection image allows the game players to select one of the five game modes 1~5 described above.

The CPU 2 then determines whether one of the game modes is selected or not in a step S4. If a game mode is selected (YES), then control proceeds to a step S5. Unless otherwise specified, it is assumed that a game mode is selected by the control lever L1 or L2 and determined by the start button ST.

In the step S5, the CPU 2 sets the competitive video game system to the selected game mode by holding data indicative of the selected game mode in a game mode data holding area in the RAM 4, so that the CPU 2 will subsequently be able of select program data and parameter data based on the data indicative of the selected game mode.

In a next step S6, the CPU 2 outputs viewpoint selection image data which represents the viewpoint selection image shown in FIG. 5. The viewpoint selection image data is supplied through the buffer 5 and the display circuits 9L, 9R to the television monitors TV of the first and second game machines 11L, 11R for displaying a viewpoint selection image thereon.

The step S6 is followed by a step S7 in which the CPU 2 determines whether a viewpoint is selected by each of the game players or not. If a viewpoint is selected (YES), then control goes to a step S8. In the step S8, the CPU 2 sets the competitive video game system to viewpoints that are selected respectively by the two game players, by writing data indicative of a selected viewpoint in an area in the RAM 4 that is assigned to one of the game players (game player entity 1P), and also writing data indicative of a selected viewpoint in an area in the RAM 4 that is assigned to the other game player (game player entity 2P), so that the CPU 2 will be able to refer to the written data during a secondary image generating process.

In a next step S9, the CPU 2 outputs team selection image data through the buffer 5 and the display circuits 9L, 9R to the television monitors TV of the first and second game machines 11L, 11R for displaying a team selection image thereon. In a step S10, the CPU 2 determines whether a soccer team is selected by each of the game players or not. If a soccer team is selected (YES), then control proceeds to a step S11.

In the step S11, the CPU 2 sets the competitive video game system to soccer teams that are selected respectively by the two game players, by writing data indicative of a selected soccer team in an area in the RAM 4 that is assigned to one of the game players (game player entity 1P), and also writing data indicative of a selected soccer team in an area in the RAM 4 that is assigned to the other game player (game player entity 2P), so that the CPU 2 will be able to refer to the written data during the secondary image generating process.

In the step S12, the CPU 2 determines whether there is a joining game player or not. If there is a joining game player (YES), then control proceeds to a step S13. If there is not a joining game player (NO), then control goes to the step S3. The CPU 2 makes the decision in the step S12 by determining whether the joining button SL is pressed after a coin has been inserted through the coin insertion slot CH.

In the step S13, the CPU 2 supplies message image data indicating that there is a joining game player through the image storage area 6L or 6R and the display buffer 10L or 10R to the television monitors TV of the first and second game machines 11L, 11R for indicating that there is a joining game player to the game player at the game machine supplied with secondary image data.

In a next step S14, the CPU 2 determines whether the game player at the game machine supplied with secondary image data has turned down the proposal to join the soccer game or not. If the game player has turned down the proposal (YES), then control goes to the step S3. If the game player has not turned down the proposal, i.e., has accepted the proposal (YES), then control goes to a step S15. The CPU 2 makes the decision in the step S14 based on an operation the control panel CP by the game player at the game machine supplied with secondary image data.

In the step S15, the CPU 2 supplies message image data indicating that the soccer game is joined by another game player through the image storage area 6L or 6R and the display buffer 10L or 10R to the television monitors TV of the first and second game machines 11L 11R for indicating that the soccer game is joined by another game player to the game players at the game machines supplied respectively with the primary and secondary image data. After the step S15, control goes to the step S3.

E. Control Sequence According to Game Program (FIGS. 10 and 11):

FIGS. 10 and 11 show a control sequence of the competitive video game system according to a game program.

In a step S20 (see FIG. 10), the CPU 2 determines whether a game process is to be carried out with respect to a game machine supplied with primary image data or not. If a game process is to be carried out with respect to a game machine supplied with primary image data (YES), then control proceeds to a step S21. If not (NO), then control goes to a step S26. The CPU 2 makes the decision in the step S20 by reading a flag stored in the communication area in the RAM 4 shown in FIG. 1.

In the step S21, the CPU 2 executes a game process with respect to the first game machine 11L or the second game machine 11R which is supplied with primary image data. The game process means a calculation process based on an operation of the control panel CP by the game player and an image display process as a result of the calculation process.

In a next step S22, the CPU 2 determines whether the viewpoint is the longitudinal viewpoint or not. If the viewpoint is the longitudinal viewpoint (YES), then control goes to a step S24. If not (NO), then control goes to a step S23.

In the step S23, the CPU 2 carries out an image conversion process to produce a transverse viewpoint and corresponding primary image data. The transverse viewpoint corresponds to the camera position H1P at the transverse viewpoint for the game player entity 1P, as shown in FIG. 2. The image conversion process is a process for calculating the positions and structures of the soccer field and game characters that are hypothetically established in the three-dimensional space, and generating images for three-dimensional display based on the calculated positions and structures. The step S23 includes a camera position calculation process which will be described in detail later on with reference to FIG. 13.

In the step S24, the CPU 2 carries out an image conversion process to produce a longitudinal viewpoint and corresponding primary image data. The longitudinal viewpoint corresponds to the camera position V1P at the longitudinal viewpoint for the game player entity 1P, as shown in FIG. 2. The image conversion process is the same as the image conversion process that is carried out in the step S23. The step S24 also includes the camera position calculation process which will be described in detail later on with reference to FIG. 13.

In a step S25, the CPU 2 generates primary image data based on the positions and structures calculated in the step S23 or S24. The generated primary image data is stored in the primary image storage area 6L, and thereafter supplied through the display buffer 10L or 10R to the television monitor TV of the first or second game machine 11L or 11R for displaying an image thereon.

In a step S26, the CPU 2 determines whether the soccer game is being played between the two game machines in the communication mode or not. If the soccer game is being played between the two game machines (YES), then control proceeds to a step S27. If not (NO), then control goes to a step S32. The CPU 2 makes the decision in the step S26 by reading a flag stored in the communication area in the RAM 4 shown in FIG. 1.

In the step S27, the CPU 2 carries out a game process for the game machine supplied with secondary image data, depending on the development of the game in the game machine supplied with primary image data, i.e., for using calculated results and image data generated as the game in the game machine supplied with primary image data progresses, as calculated results and image data for the game machine supplied with secondary image data. A viewpoint for the game machine supplied with secondary image data is complementary to the viewpoint established for the game machine supplied with primary image data. Therefore, data for the game machine supplied with secondary image data can be obtained simply by converting two- or three-dimensional coordinate values that have been produced for the game machine supplied with primary image data into those for the game machine supplied with secondary image data. This game process requires a smaller number of steps than would be required if data for the game machine supplied with secondary image data were fully calculated, resulting in an increased processing speed.

In a step S28, the CPU 2 determines whether the viewpoint is the longitudinal viewpoint or not. If the viewpoint is the longitudinal viewpoint (YES), then control goes to a step S29. If not (NO), then control goes to a step S30.

In the step S29, the CPU 2 carries out the image conversion process to produce a longitudinal viewpoint and corresponding secondary image data. The longitudinal viewpoint corresponds to the camera position V2P at the longitudinal viewpoint for the game player entity 2P, as shown in FIG. 2. The image conversion process is a process for calculating the positions and structures of the soccer field and game characters that are hypothetically established in the three-dimensional space, and generating images for three-dimensional display based on the calculated positions and structures. The step S29 includes the camera position calculation process which will be described in detail later on with reference to FIG. 13.

In the step S30, the CPU 2 carries out an image conversion process to produce a transverse viewpoint for secondary image data. The transverse viewpoint corresponds to the camera position H2P at the longitudinal viewpoint for the game player entity 2P, as shown in FIG. 2. The image conversion process is the same as the image conversion process that is carried out in the step S29. The step S30 also includes the camera position calculation process which will be described in detail later on with reference to FIG. 13.

In a step S31, the CPU 2 generates secondary image data based on the positions and structures calculated in the step S29 or S30. The generated primary image data is stored in the secondary image storage area 6r, and thereafter supplied through the display buffer 10L or 10R to the television monitor TV of the first or second game machine 11L or 11R for displaying an image thereon.

In the step S32, the CPU 2 executes a game process with respect to the first game machine 11L or the second game machine 11R which is supplied with secondary image data. The game process means a calculation process based on an operation of the control panel CP by the game player and an image display process as a result of the calculation process.

In a step S33, the CPU 2 determines whether the viewpoint is the longitudinal viewpoint or not. If the viewpoint is the longitudinal viewpoint (YES), then control goes to the step S29. If not (NO), then control goes to the step S30.

Figure 12:
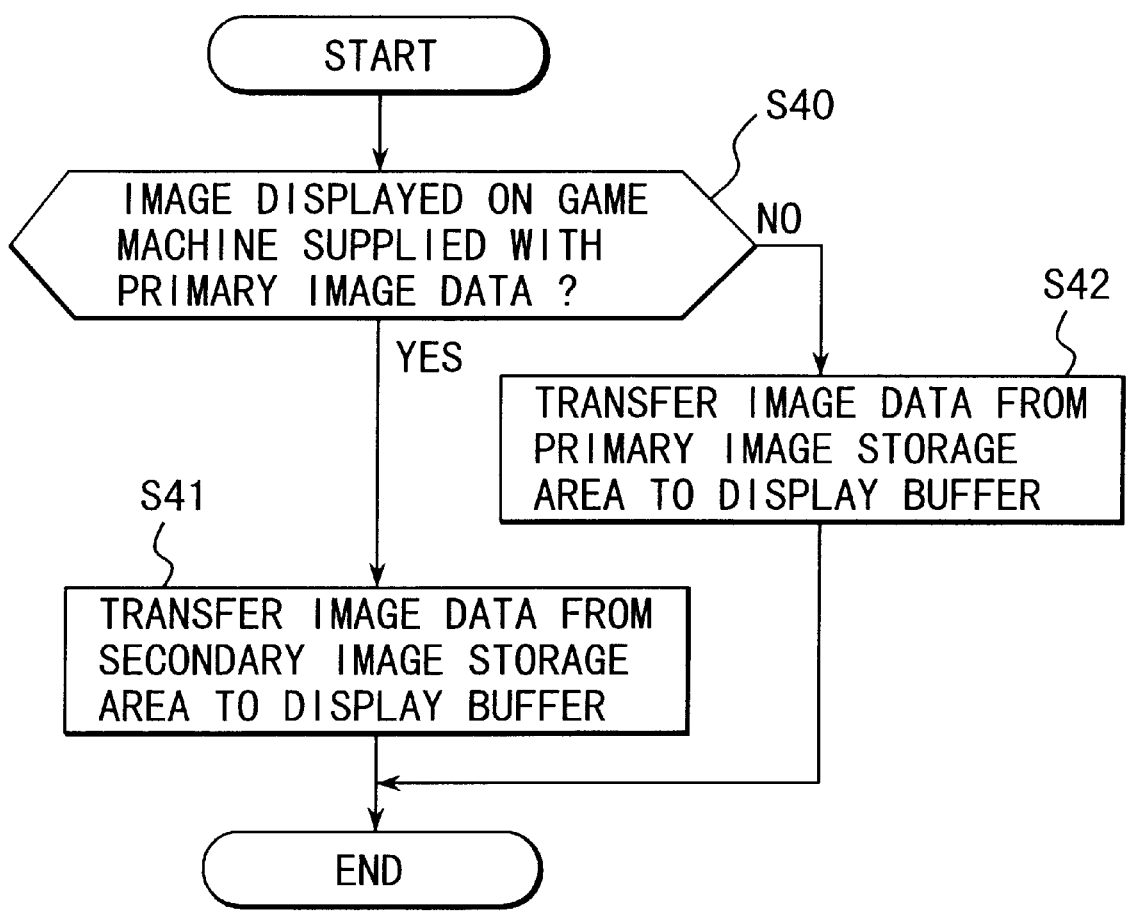
FIG. 12 is a flowchart of a control sequence of the competitive video game system according to a display program.

F. Control Sequence According to Display Program (FIG. 12):

FIG. 12 shows a control sequence of the competitive video game system according to a display program.

In a step S40, the CPU 2 determines whether an image is being displayed on the game machine which is supplied with primary image data. If an image is being displayed on the game machine which is supplied with primary image data (YES), then control proceeds to a step S41. If not (NO), then control goes to a step S42.

In the step S41, the CPU 2 supplies image data stored in the secondary image storage area 6R to the display buffer 10L or 10R. The supplied image data is then read from the display buffer 10L or 10R, and supplied to the television monitor TV of the first or second game machine 11L or 11R for displaying an image thereon.

In the step S42, the CPU 2 supplies image data stored in the primary image storage area 6L to the display buffer 10L or 10R. The supplied image data is then read from the display buffer 10L or 10R, and supplied to the television monitor TV of the first or second game machine 11L or 11R for displaying an image thereon.

G. Control Sequence According to Camera Position Calculation Program (FIG. 13):

FIG. 13 shows a control sequence of the competitive video game system according to a camera position calculation program in each of the steps S23, S24, S29, S30.

In a step S50, the CPU 2 determines whether the viewpoint is the longitudinal viewpoint or not. If the viewpoint is the longitudinal viewpoint (YES), then control goes to a step S51. If not (NO), then control goes to a step S54.

In the step S51, the CPU 2 determines whether the presently established viewpoint corresponds to the camera position V1P or not. If the presently established viewpoint corresponds to the camera position V1P (YES), then control proceeds to a step S52. If not (NO), then control goes to a step S53.

In the step S52, the CPU 2 calculates the positions and structures of the soccer field and game characters that are hypothetically established in the three-dimensional space, as viewed from the camera position V1P.

In the step S53, the CPU 2 calculates the positions and structures of the soccer field and game characters that are hypothetically established in the three-dimensional space, as viewed from the camera position V2P.

In the step S54, the CPU 2 determines whether the presently established viewpoint corresponds to the camera position H1P or not. If the presently established viewpoint corresponds to the camera position H1P (YES), then control proceeds to a step S55. If not (NO), then control goes to a step S56.

In the step S55, the CPU 2 calculates the positions and structures of the soccer field and game characters that are hypothetically established in the three-dimensional space, as viewed from the camera position H1P.

In the step S56, the CPU 2 calculates the positions and structures of the soccer field and game characters that are hypothetically established in the three-dimensional space, as viewed from the camera position H2P.

In the illustrated embodiment, the CPU 2 transfers image data stored in the buffer 5 to the display circuits 9L, 9R. However, the image data may be transferred by a DMA (Direct Memory Access) circuit.

According to the present invention, as described above, two or more game players who play a competitive video game on the competitive video game system with the first and second game machines 11L 11R are allowed to freely select viewpoints for displaying images on the respective television monitors TV. Therefore, the competitive video game system can provide a comfortable game playing environment for two game players, one not skillful enough at game playing in the longitudinal display mode and one not skillful enough at game playing in the transverse display mode, to play a competitive video game, because each of the game players can select either the longitudinal display mode or the transverse display mode for a preferable viewpoint for displayed images.

Although a certain preferred embodiment of the present invention has been shown and described in detail, it should be understood that various changes and modifications may be made therein without departing from the scope of the appended claims.

What is claimed is:

1. A video game system for playing a video game, comprising:
   at least first and second game machine units each having manual input controls and a display unit;
   a control system including:
      initiation determination means for determining a first initiated machine of said first and second game machine units that is first initiated by a player;
      view selection reading means for reading viewpoint selections of players at each of said first and second game machine units, made via respective ones of said manual input controls, of one of at least two viewpoints of a field of play of the video game without affecting of a status of play of the video game;
      an image information generating means for generating image coordinate and structure data of said field of play, representative of images to be displayed on said display units, based on control signals supplied from said manual input controls and a predetermined game routine;
      a primary image buffer memory and a secondary image buffer memory;
      primary image data generation means for converting said image coordinate and structure data into primary image data based on the viewpoint selection of the player at one of said first and second game machine units that is said first initiated machine and storing said primary image data in said primary image data buffer memory;

secondary image data generation means for converting said image coordinate and structure data into secondary image data based on the viewpoint selection of the player at another one of said first and second game machine units and storing said secondary image data in said secondary image data buffer memory; and display generation means for driving said display units to display images thereon including:

a first display buffer and driver circuit for driving said display of said first game machine unit;

a second display buffer and driver circuit for driving said display of said second game machine unit; and data transfer means for transferring primary image data from said primary image buffer memory into one of said first and second display buffers which is for said one of said first and second game machine units that is said first initiated machine and for transferring secondary image data from said secondary image buffer memory into another one of said first and second display buffers.

2. A video game system according to claim 1, wherein:

said field of play is a field having a transverse direction and a longitudinal direction; and said at least two viewpoints include a transverse viewpoint for viewing said field along the transverse direction thereof and a longitudinal viewpoint for viewing said field alone the longitudinal direction thereof.

3. A method of displaying images in a video game system having at least first and second game machine units, each having a display unit and manual input controls for player input, and a field of play which is a field having first and second ends with a longitudinal direction extending between said first and second ends and first and second sides with a transverse direction extending between said first and second sides, comprising the steps of:

accepting input from a player at said first game machine unit selecting one of two viewpoints including a transverse viewpoint for viewing said field along the transverse direction from a position adjacent said first side and a longitudinal viewpoint for viewing said field along the longitudinal direction from a position adjacent said first end;

accepting input from a player at said second game machine unit selecting one of two viewpoints including a transverse viewpoint for viewing said field along the transverse direction from a position adjacent said second side and a longitudinal viewpoint for viewing said field along the longitudinal direction from a position adjacent said second end;

generating image data representative of images to be displayed on said display units, based on control signals supplied from said manual input controls and the selected viewpoints selected by said game players;

supplying the generated image data of the selected viewpoint of the player at the first game machine unit to said display unit of said first game machine unit; and supplying the generated image data of the selected viewpoint of the player at the second game machine unit to said display unit of said second game machine unit.

4. A video game system according to claim 1, wherein said field of play is an elongated field.

5. A video game system according to claim 1, wherein said at least two viewpoints of a field of play selectable at said first game machine unit are mutually exclusive of said at least two viewpoints of a field of play selectable at said second game machine unit.

6. The video game system according to claim 2, wherein said at least two viewpoints of a field of play selectable at said first game machine unit are mutually exclusive of said at least two viewpoints of a field of play selectable at said second game machine unit.

7. The video game system according to claim 2, wherein said field is an elongated field elongated in said longitudinal direction.

8. The method according to claim 3, wherein said at least two viewpoints of a field of play selectable at said first game machine unit are mutually exclusive of said at least two viewpoints of a field of play selectable at said second game machine unit.

9. A video game system according to claim 1, wherein:

said field of play is a field having first and second ends, with a longitudinal direction extending between said first and second ends, and first and second sides with a transverse direction extending between said first and second sides;

said at least two viewpoints provided for selection at said first game machine unit include a transverse viewpoint for viewing said field along the transverse direction from a position adjacent said first side and a longitudinal viewpoint for viewing said field along the longitudinal direction from a position adjacent said first end; and said at least two viewpoints provided for selection at said second game machine unit include a transverse viewpoint for viewing said field along the transverse direction from a position adjacent said second side and a longitudinal viewpoint for viewing said field along the longitudinal direction from a position adjacent said second end.

10. The video game system according to claim 9, wherein said at least two viewpoints of a field of play selectable at said first game machine unit are mutually exclusive of said at least two viewpoints of a field of play selectable at said second game machine unit.

11. The video game system according to claim 9, wherein said field is an elongated field elongated in said longitudinal direction.

12. A video game system for playing a video game, comprising:

at least first and second game machine units each having manual input controls and a display unit; and a control system including:

an image information generating means for generating, based on control signals supplied from said manual input controls and a predetermined game routine, image coordinate and structure data of a field of play which is a field having first and second ends with a longitudinal direction extending between said first and second ends and first and second sides with a transverse direction extending between said first and second sides;

view selection reading means for reading viewpoint selections of players at each of said first and second game machine units, made via respective ones said manual input controls, of one of at least two viewpoints of a field of play of the video game without affecting of a status of play of the video game;

said at least two viewpoints provided for selection at said first game machine unit including a transverse viewpoint for viewing said field along the transverse direction from a position adjacent said first side and a longitudinal viewpoint for viewing said field along the longitudinal direction from a position adjacent said first end;

said at least two viewpoints provided for selection at said second game machine unit including a transverse viewpoint for viewing said field along the transverse direction from a position adjacent said second side and a longitudinal viewpoint for viewing said field along the longitudinal direction from a position adjacent said second end;

a primary image buffer memory and a secondary image buffer memory;

primary image data generation means for converting said image coordinate and structure data into primary image data based on the viewpoint selection of the player at one of said first and second game machine units and storing said primary image data in said primary image buffer memory;

secondary image data generation means for converting said image coordinate and structure data into secondary image data based on the viewpoint selection of the player at another one of said first and second game machine units and storing said secondary image data in said secondary image buffer memory; and display generation means for driving said display unit of said first game machine unit to produce images based on one of siad primary image data and said secondary image data and for driving said display unit of said second game machine unit to produce images based on another one of siad primary image data and said secondary image data.

13. The video game system according to claim 12 further comprising:

said control system having an initiation determination means for determining a first initiated machine of said first and second game machine units that is first initiated by a player;

said primary image determination means including discrimination means for using the viewpoint selection of the player at one of said first and second game machine units that is said first initiated machine;

said secondary image determination means including discrimination means for using the viewpoint selection of the player at another one of said first and second game machine units that is not said first initiated machine; p1 said display generation means including:

a first display buffer and driver circuit for driving said display of said first game machine unit;

a second display buffer and driver circuit for driving said display of said second game machine unit; and data transfer means for transferring primary image data from said primary image buffer memory into one of said first and second display buffers which is for said one of said first and second game machine units that is said first initiated machine and for transferring secondary image data from said secondary image buffer memory into another one of said first and second display buffers.

14. The video game system according to claim 13, wherein said field is an elongated field elongated in said longitudinal direction.

15. The video game system according to claim 12, wherein said field is an elongated field elongated in said longitudinal direction.

16. The video game system according to claim 12, wherein said at least two viewpoints of a field of play selectable at said first game machine unit are mutually exclusive of said at least two viewpoints of a field of play selectable at said second game machine unit.

17. The method according to claim 3, wherein said field is an elongated field elongated in said longitudinal direction.

18. A video game system for playing a video game, comprising:

at least first and second game machine units each having manual input controls and a display unit; a control system including:

view selection reading means for reading viewpoint selections of players at each of said first and second game machine units, made via respective ones of said manual input controls, of one of at least two viewpoints of a field of play of the video game without affecting of a status of play of the video game;

an image information generating means for generating image coordinate and structure data of said field of play, representative of images to be displayed on said display units, based on control signals supplied from said manual input controls and a predetermined game routine;

a primary image buffer memory and a secondary image buffer memory;

primary image data generation means for converting said image coordinate and structure data into primary image data based on the viewpoint selection of the player at one of said first and second game machine units and storing said primary image data in said primary image data buffer memory;

secondary image data generation means for converting said image coordinate and structure data into secondary image data based on the viewpoint selection of the player at another one of said first and second game machine units and storing said secondary image data in said secondary image data buffer memory; and display generation means for driving said display units to display images thereon using said primary image data and said secondary data in accordance with said viewpoint selections.

19. A video game system according to claim 18, wherein:

said field of play is a field having first and second ends, with a longitudinal direction extending between said first and second ends, and first and second sides with a transverse direction extending between said first and second sides;

said at least two viewpoints provided for selection at said first game machine unit include a transverse viewpoint for viewing said field along the transverse direction from a position adjacent said first side and a longitudinal viewpoint for viewing said field along the longitudinal direction from a position adjacent said first end; and said at least two viewpoints provided for selection at said second game machine unit include a transverse viewpoint for viewing said field along the transverse direction from a position adjacent said second side and a longitudinal viewpoint for viewing said field along the longitudinal direction from a position adjacent said second end.

20. The video game system according to claim 19, wherein said at least two viewpoints of a field of play selectable at said first game machine unit are mutually exclusive of said at least two viewpoints of a field of play selectable at said second game machine unit.

21. The video game system according to claim 19, wherein said field is an elongated field elongated in said longitudinal direction.

* * * * *